United States Patent
Murao et al.

(10) Patent No.: US 9,459,462 B2
(45) Date of Patent: Oct. 4, 2016

(54) STEREOSCOPIC DISPLAY DEVICE

(71) Applicant: Sharp Kabushiki Kaisha, Osaka-shi, Osaka (JP)

(72) Inventors: Takehiro Murao, Osaka (JP); Takuto Yoshino, Osaka (JP); Hiroshi Fukushima, Osaka (JP); Tomoo Takatani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 44 days.

(21) Appl. No.: 14/368,831

(22) PCT Filed: Dec. 21, 2012

(86) PCT No.: PCT/JP2012/083234
§ 371 (c)(1),
(2) Date: Jun. 26, 2014

(87) PCT Pub. No.: WO2013/099794
PCT Pub. Date: Jul. 4, 2013

(65) Prior Publication Data
US 2014/0362315 A1 Dec. 11, 2014

(30) Foreign Application Priority Data
Dec. 28, 2011 (JP) .................................. 2011-289341

(51) Int. Cl.
*G02B 27/26* (2006.01)
*G02F 1/1335* (2006.01)
*H04N 13/04* (2006.01)

(52) U.S. Cl.
CPC ......... *G02B 27/26* (2013.01); *G02F 1/133528* (2013.01); *G02F 1/133536* (2013.01); *H04N 13/0409* (2013.01); *H04N 13/0452* (2013.01); *G02F 2001/133531* (2013.01)

(58) Field of Classification Search
CPC ............. G02F 1/133536; G02F 2001/133531; G02F 1/133528; H04N 13/0409; H04N 13/0452; G02B 27/26
USPC .......................................................... 349/15
See application file for complete search history.

(56) References Cited

U.S. PATENT DOCUMENTS

| 8,823,888 B2 * | 9/2014 | Tsai | ................... G02B 27/2214 345/419 |
| 2004/0100598 A1 * | 5/2004 | Adachi | ............. G02F 1/133536 349/113 |

FOREIGN PATENT DOCUMENTS

JP 3419766 B2 6/2003

OTHER PUBLICATIONS

Official Communication issued in International Patent Application No. PCT/JP2012/083234, mailed on Jan. 29, 2013.

*Primary Examiner* — Charles Chang
(74) *Attorney, Agent, or Firm* — Keating & Bennett, LLP

(57) ABSTRACT

The objective is to provide a stereoscopic display device that can be switched among 2D display mode, 3D display mode and mirror mode, where 2D display may be realized even while the device is staying in mirror mode. The device includes: a display panel (12); a switch liquid crystal panel (14); an absorptive polarizer (16); and a reflective polarizer (22). The switch liquid crystal panel is located closer to the viewer than the display panel is. The absorptive polarizer is located closer to the viewer than the switch liquid crystal panel is. The reflective polarizer is located between the display panel and the switch liquid crystal panel. The reflective polarizer passes those components of light entering the reflective polarizer that are parallel to the transmission axis (L6) while reflecting those components that are perpendicular to the transmission axis. At least one of the substrates (32, 34) includes a transparent region (58) capable of passing light from the display panel.

2 Claims, 12 Drawing Sheets

STEREOSCOPIC DISPLAY DEVICE

TECHNICAL FIELD

The present invention relates to a stereoscopic display device with a switch liquid crystal panel, and more particularly, to a stereoscopic display device with a mirror capability.

BACKGROUND ART

There is a growing need for display devices with various additional values. One example is a stereoscopic display device that allows the viewer to see stereoscopic video without special glasses. One known scheme for realizing this uses a parallax barrier.

A parallax barrier based stereoscopic display device may include, for example, a display panel and a switch liquid crystal panel, where the display panel displays a stereoscopic image and the switch liquid crystal panel forms a parallax barrier that divides the stereoscopic image into sub-images. The parallax barrier includes apertures that pass light and light-shielding portions that block light. In the parallax barrier, apertures and light-shielding portions are arranged alternately.

Such a parallax barrier based stereoscopic display device with a switch liquid crystal panel may include a mirror capability for the display screen of the display device as a further additional value.

Japanese Patent No. 3419766 discloses a display device with a mirror capability. This display device may be switched between 2D image display mode and mirror mode; however, it is not capable of realizing 3D display. This patent also fails to describe performing 2D display while the device is staying in mirror mode.

DISCLOSURE OF THE INVENTION

An object of the present invention is to provide a stereoscopic display device that can be switched among 2D display mode, 3D display mode and mirror mode, where 2D display may be realized even while the device is staying in mirror mode.

A stereoscopic display device of the present invention includes: a display panel; a switch liquid crystal panel located closer to a viewer than the display panel is; an absorptive polarizer located closer to the viewer than the switch liquid crystal panel is; and a reflective polarizer located between the display panel and the switch liquid crystal panel, wherein the display panel is capable of selectively displaying a planar image and a stereoscopic image, the switch liquid crystal panel is capable of forming a parallax barrier having transparent portions and light-shielding portions arranged alternately, the absorptive polarizer is capable of passing those components of light entering the absorptive polarizer that are parallel to a transmission axis of the absorptive polarizer while absorbing those components that are perpendicular to the transmission axis of the absorptive polarizer, the reflective polarizer has a transmission axis perpendicular to the transmission axis of the absorptive polarizer and is capable of passing those components of light entering the reflective polarizer that are parallel to the transmission axis of the reflective polarizer while reflecting those components that are perpendicular to the transmission axis of the reflective polarizer, the switch liquid crystal panel includes: a pair of substrates; a liquid crystal layer enclosed between the substrates; a common electrode provided on one of the substrates; a plurality of first driving electrodes provided on the other one of the substrates for working together with the common electrode to form the light-shielding portions when a voltage is applied; and a plurality of first auxiliary electrodes provided on the other one of the substrates, the driving electrodes and the auxiliary electrodes being arranged alternately, and at least one of the substrates includes a transparent region capable of passing light from the display panel.

The stereoscopic display device of the present invention can be switched among 2D display mode, 3D display mode and mirror mode, where 2D display may be realized even while the device is staying in mirror mode.

EMBODIMENTS FOR CARRYING OUT THE INVENTION

Figure 1:
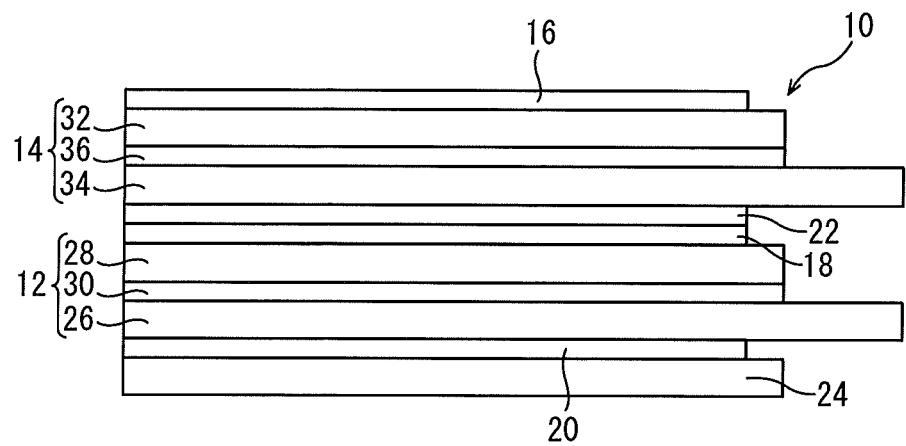
FIG. 1 is a schematic view of an example of a stereoscopic display device of a first embodiment of the present invention.

A stereoscopic display device according to an embodiment of the present invention includes: a display panel; a switch liquid crystal panel located closer to a viewer than the display panel is; an absorptive polarizer located closer to the viewer than the switch liquid crystal panel is; and a reflective polarizer located between the display panel and the switch liquid crystal panel, wherein the display panel is capable of selectively displaying a planar image and a stereoscopic image, the switch liquid crystal panel is capable of forming a parallax barrier having transparent portions and light-shielding portions arranged alternately, the absorptive polarizer is capable of passing those components of light entering the absorptive polarizer that are parallel to a transmission axis of the absorptive polarizer while absorbing those components that are perpendicular to the transmission axis of the absorptive polarizer, the reflective polarizer has a transmission axis perpendicular to the transmission axis of the absorptive polarizer and is capable of passing those components of light entering the reflective polarizer that are parallel to the transmission axis of the reflective polarizer while reflecting those components that are perpendicular to the transmission axis of the reflective polarizer, the switch liquid crystal panel includes: a pair of substrates; a liquid crystal layer enclosed between the substrates; a common electrode provided on one of the substrates; a plurality of first driving electrodes provided on the other one of the substrates for working together with the common electrode to form the light-shielding portions when a voltage is applied; and a plurality of first auxiliary electrodes provided on the other one of the substrates, the driving electrodes and the auxiliary electrodes being arranged alternately, and at least one of the substrates includes a transparent region capable of passing light from the display panel (first arrangement).

In the first arrangement, the device is in 2D display mode as a planar image (2D image) is displayed on the display panel when no parallax barrier is formed in the switch liquid crystal panel. The device is in 3D display mode as a stereoscopic image is displayed on the display panel when a parallax barrier is formed in the switch liquid crystal panel. The device is in mirror mode as a voltage is applied between the driving electrodes and common electrode and between the auxiliary electrodes and common electrode to cause light entering the device through the side closer to the viewer to be reflected by the reflective polarizer.

In the first arrangement, the device may be switched among 2D display mode, 3D display mode and mirror mode by switching between electrodes for voltage application when a voltage is applied to the liquid crystal layer of the switch liquid crystal panel.

In the first arrangement, at least one of the substrates includes a transparent region capable of passing light from the display panel. This will allow the viewer to see a planar image while a mirror is formed as a planar image is displayed on the display panel when a mirror is formed, without adjusting the voltages applied between the driving electrodes and common electrode and between the auxiliary electrodes and common electrode (i.e. the voltages for forming a mirror).

In a second arrangement, starting from the first arrangement above, the transparent region is an opening formed in each of the first auxiliary electrodes. In the second arrangement, the transparent region may be implemented in a simple manner.

In a third arrangement, starting from the second arrangement above, a plurality of openings are arranged in a longitudinal direction of the first auxiliary electrode. In the third arrangement, light from the display panel can easily pass through.

In a fourth arrangement, starting from the first arrangement above, the transparent region includes gaps formed between the first driving electrodes and the first auxiliary electrodes. In the fourth arrangement, for example, the size of the gaps formed between the first driving electrodes and the first auxiliary electrodes may be adjusted so as to focus light when the device is in 3D display mode. This will improve luminance when the device is in 3D display mode.

In a fifth arrangement, starting from the first arrangement above, the common electrode includes: a plurality of second driving electrodes provided on the one of the substrates; and a plurality of second auxiliary electrodes provided on the one of the substrates, the second driving electrodes and the second auxiliary electrodes being arranged alternately, the second driving electrodes and the second auxiliary electrodes being perpendicular to the first driving electrodes and the first auxiliary electrodes as viewed looking at a front side of the switch liquid crystal panel. In the fifth arrangement, stereoscopic display may be realized for landscape display or portrait display.

In a sixth arrangement, starting from one of the first to fifth arrangements above, the transparent region, as viewed looking at a front side of the switch liquid crystal panel, has an area that is 20% or less of an area of an active area of the switch liquid crystal panel. In the sixth arrangement, 2D image display and good mirror properties may be realized at the same time. Active area of a switch liquid crystal panel means the area of the stereoscopic display device that is designed to form a mirror, for example the area covered by the common electrode.

Now, more specific embodiments of the present invention will be described with reference to the drawings. The same or corresponding components in the drawings are labeled with the same characters and their description will not be repeated. For ease of explanation, the drawings to which reference will be made hereinafter show simplified or schematic representation, or do not show some components. The size ratios of the components shown in the drawings do not necessarily represent the actual size ratios.

First Embodiment

FIG. 1 shows a stereoscopic display device 10 of a first embodiment of the present invention. The stereoscopic display device 10 includes a display panel 12, a switch liquid crystal panel 14, absorptive polarizers 16, 18 and 20, a reflective polarizer 22 and a backlight 24.

The display panel 12 is a liquid crystal panel. The display panel 12 includes an active-matrix substrate 26, a counter substrate 28 and a liquid crystal layer 30 enclosed between these substrates 26 and 28. In the display panel 12, any operating mode of liquid crystal may be used.

The display panel 12 includes a plurality of pixels. The pixels may be arranged in a matrix, for example. The region in which the pixels are provided forms the display region of the display panel 12.

Each pixel may include a plurality of sub-pixels. The sub-pixels may be, for example, a red sub-pixel, green sub-pixel and blue sub-pixel. The sub-pixels may further include sub-pixels of other colors.

In the display panel 12, columns of pixels for displaying an image to be seen by the right eye of the viewer (i.e. a right-eye image) and columns of pixels for displaying an image to be seen by the left eye of the viewer (i.e. a left-eye image) are alternately arranged in a horizontal direction of the display panel 12. In other words, each of the right- and left-eye images is divided into sub-images corresponding to the pixel columns (i.e. into stripes). Then, a composite image including these stripes of right- and left-eye images arranged alternately is displayed in the display region of the liquid crystal display panel 12.

Figure 2:
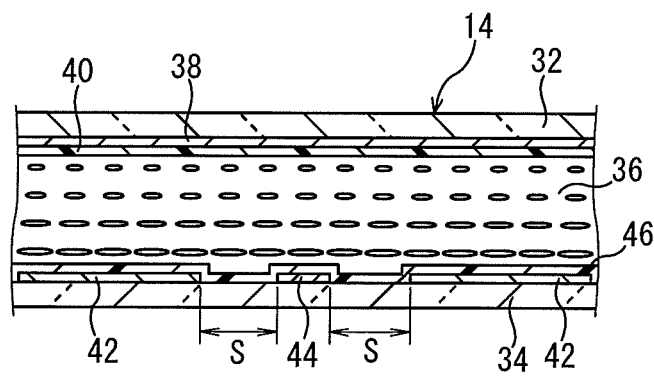
FIG. 2 is a schematic cross-sectional view of an example of a switch liquid crystal panel.

The switch liquid crystal panel 14 is located on one of the sides of the display panel 12 disposed in a thickness direction thereof. As shown in FIG. 2, the switch liquid crystal panel 14 includes a pair of substrates 32 and 34 and a liquid crystal layer 36.

The substrate 32 may be, for example, a low-alkali glass substrate. A common electrode 38 is provided on the substrate 32.

The common electrode 38 may be a transparent conductive film made of, for example, indium tin oxide (ITO). The common electrode 38 is provided substantially over an entire major surface of the substrate 32.

Figure 3:
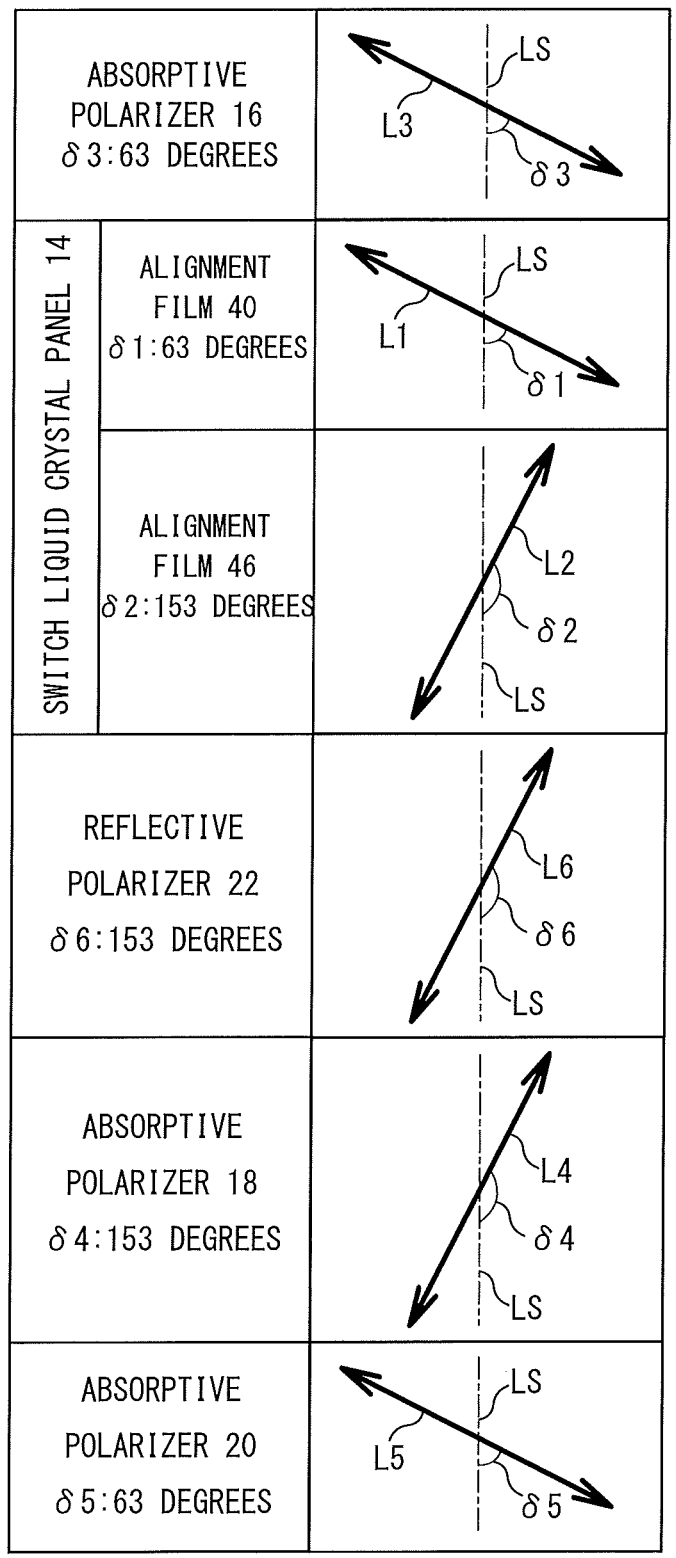
FIG. 3 illustrates the relationship between the rubbing axes of the alignment films, the transmission axes of the absorptive polarizers and the transmission axis of the reflective polarizer.

The common electrode 38 is covered with an alignment film 40. The alignment film 40 may be, for example, a polyimide resin film. As shown in FIG. 3, in the present embodiment, the rubbing axis of the alignment film 40, L1, and a reference line LS extending in a vertical direction of the display region of the display panel 12 (i.e. a vertical direction of the substrates 32 and 34) form an angle δ1 of 63 degrees.

Figure 4:
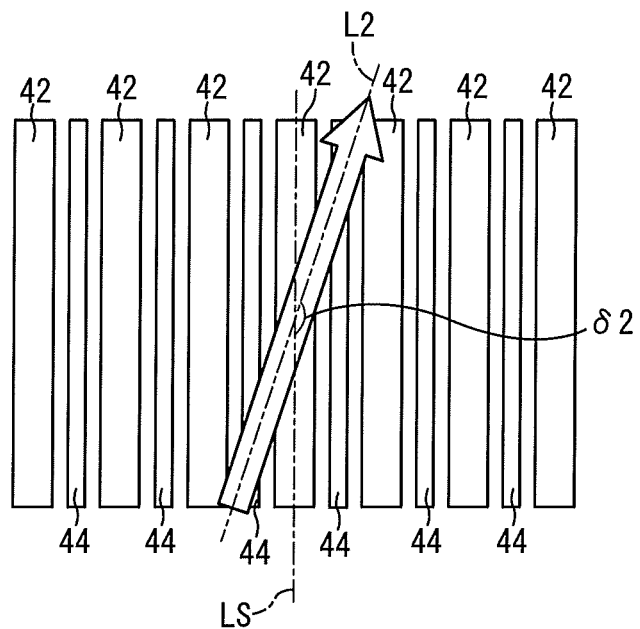
FIG. 4 is a plan view of driving electrodes and auxiliary electrodes provided on the other one of the substrates of the switch liquid crystal panel.

The substrate 34 may be, for example, a low-alkali glass substrate. On the substrate 34, as shown in FIG. 4, driving electrodes (first driving electrodes) 42 and auxiliary electrodes (first auxiliary electrodes) 44 are arranged alternately. The electrodes 42 and 44 may be, for example, transparent conductive films of indium tin oxide (ITO).

Each of the electrodes 42 and 44 extends in a vertical direction of the substrate 34 (i.e. a vertical direction of the display region of the display panel 12) with a generally constant width. In other words, the driving electrodes 42 and auxiliary electrodes 44 are alternately arranged in a horizontal direction of the substrate 44 (i.e. a horizontal direction of the display region of the display panel 12).

A gap S that serves as a transparent region (see FIGS. 2 and 4) is formed between a driving electrode 42 and auxiliary electrode 44. The gap S may have a size (i.e. a width as measured in a horizontal direction of the substrate 34) of 25 µm or smaller, for example. The smaller the gap S, the better the mirror functionality becomes but, as a tradeoff, the lower the luminance of 2D images displayed at the same time becomes. Since the luminance of 2D images needs to be increased while maintaining good mirror functionality, it is desirable that the gap S have such a size that the sum of the widths of a driving electrode 42 and an auxiliary electrode 44 is equal to or larger than 80% of the pitch of the driving electrodes 42.

The electrodes 42 and 44 are covered with an alignment film 46. The alignment film 46 may be, for example, a polyimide resin film. As shown in FIG. 3, the rubbing axis of the alignment film 46, L2, and the reference line LS form an angle δ2 of 153 degrees.

The liquid crystal layer 36 is enclosed between the substrates 32 and 34. In the switch liquid crystal panel 14, the operating mode of the liquid crystal is TN mode.

The absorptive polarizer 16 is located on one of the sides of the switch liquid crystal panel 14 disposed in a thickness direction thereof. As shown in FIG. 3, in the present embodiment, the transmission axis of the absorptive polarizer 16 (transmission axis), L3, and the reference line LS form an angle δ3 of 63 degrees.

The absorptive polarizer 18 is located between the switch liquid crystal panel 14 and display panel 12. As shown in FIG. 3, in the present embodiment, the transmission axis of the absorptive polarizer 18 (transmission axis), L4, and the reference line LS form an angle δ4 of 153 degrees.

The absorptive polarizer 20 is located on the other one of the sides of the display panel 12 disposed in a thickness direction thereof. As shown in FIG. 3, in the present embodiment, the transmission axis of the absorptive polarizer 20 (transmission axis), L5, and the reference line LS form an angle δ5 of 63 degrees.

The reflective polarizer 22 is located between the switch liquid crystal panel 14 and absorptive polarizer 18. The reflective polarizer 22 may be, for example, a luminance improving film. The reflective polarizer 22 has a transmission axis L6 (see FIG. 3). The reflective polarizer 22 passes those components of light entering the reflective polarizer 22 that are parallel to the transmission axis L6 and reflects those light components that are perpendicular to the transmission axis L6. As shown in FIG. 3, the transmission axis of the reflective polarizer 22, L6, is parallel to the transmission axis L4 of the absorptive polarizer 18 and the rubbing axis L2 of the alignment film 46. The transmission axis L6 of the reflective polarizer 22 need not be exactly parallel to the transmission axis L4 and rubbing axis L2, and may be generally parallel thereto. The reflective polarizer 22 may be, for example, a film laminate including a plurality of thin films of dielectric material, a film laminate including a plurality of thin films with different refractive index anisotropies, or a film laminate including a cholesteric liquid crystal layer and a retardation film. The reflective polarizer may be, for example, a product of the DBEF series from 3M Company.

The reflective polarizer 22 may incorporate the absorptive polarizer 18. In such implementations, the reflective polarizer 22 and absorptive polarizer 18 may be treated as an integral component. The reflective polarizer 22 incorporating the absorptive polarizer 18 may be, for example, a polarizer with a luminance improving film from Nitto Denko Corporation (NIPOCS).

The backlight 24 is located backward with respect to the display panel 12 (on the side thereof opposite the side closer to the viewer). The backlight 24 illuminates the display region of the display panel 12. The backlight 24 may be of any type. Any light source may be used for the backlight 24.

In the stereoscopic display device 10, the parallax barrier is formed in the switch liquid crystal panel 14. The parallax barrier 48 will be described with reference to FIG. 5.

When the parallax barrier 48 is to be formed, the driving electrodes 42 and the common electrode 38 may be caused to be at different potentials, while the auxiliary electrodes 44 and the common electrode 38 may be caused to be at the same potential. This changes the orientation of those liquid crystal molecules 50 that are located between the driving electrodes 42 and common electrode 38. Thus, those portions of the liquid crystal layer 36 located between the driving electrodes 42 and common electrode 38 function as light-shielding portions 52, while the portions between the light-shielding portions 52 function as transparent portions 54. As a result, the parallax barrier 48 is formed in the liquid crystal layer 36 where the light-shielding portions 52 and transparent portions 54 are arranged alternately.

To form the parallax barrier 48 in the switch liquid crystal panel 14, voltages may be applied to the electrodes 38, 42 and 44 where the voltage applied to the driving electrodes 42 and the voltage applied to the common electrode 38 and auxiliary electrodes 44 are in opposite phases, or where a voltage is applied to the driving electrodes 42 while the common electrode 38 and auxiliary electrodes 44 are grounded, or where the driving electrodes 42 are grounded while a voltage is applied to the common electrode 38 and auxiliary electrodes 44. The voltage applied may have a rectangular wave with 5 volts, for example.

The stereoscopic display device 10 may be switched among 2D display mode, 3D display mode and mirror mode. These modes will be described below.

(1) 2D Display Mode

Figure 6:
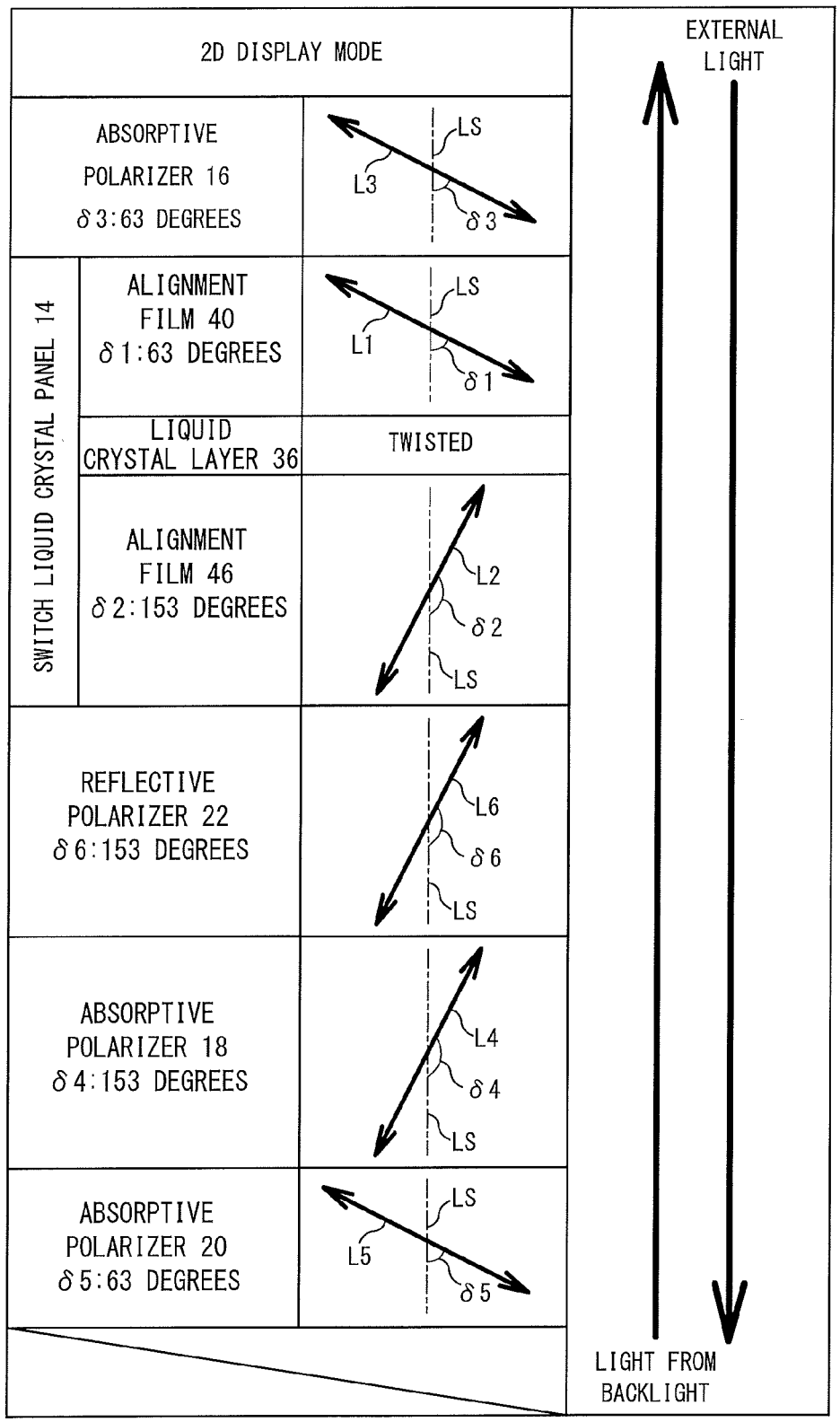
FIG. 6 illustrates how light advances when the stereoscopic display device is in 2D display mode.

FIG. 6 illustrates how light (light from the backlight and external light) advances when the stereoscopic display device 10 is in 2D display mode. In 2D display mode, the display panel 12 displays 2D images and the parallax barrier 48 is not formed in the switch liquid crystal panel 14.

(1.1) Switch Liquid Crystal Panel in 2D Display Mode

In 2D display mode, as shown in FIG. 2, no voltage is applied between the driving electrodes 42 and common electrode 38 or between the auxiliary electrodes 44 and common electrode 38. That is, the orientation of the liquid crystal molecules 50 in the liquid crystal layer 36 remains unchanged.

(1.2) How External Light Advances

External light enters the absorptive polarizer 16. The absorptive polarizer 16 absorbs those components of entering external light that are perpendicular to the transmission axis L3 and passes those components that are parallel to the transmission axis L3. Consequently, external light entering the switch liquid crystal panel 14 only has components parallel to the transmission axis L3.

The rubbing axis L1 of the alignment film 40 is parallel to the transmission axis L3 of the absorptive polarizer 16. In the switch liquid crystal panel 14, the operating mode of liquid crystal is TN mode and the orientation of the liquid crystal molecules 50 remains unchanged. In other words, in the switch liquid crystal panel 14, as shown in FIG. 2, the liquid crystal molecules 50 are twisted 90 degrees. Further, the rubbing axis L2 of the alignment film 46 is perpendicular to the rubbing axis L1 of the alignment film 40. Consequently, the polarizing axis of external light that has entered the switch liquid crystal panel 14 is rotated 90 degrees when the light passes through the switch liquid crystal panel 14.

The rubbing axis L1 of the alignment film 40 is parallel to the transmission axis L6 of the reflective polarizer 22. Consequently, external light that has passed through the switch liquid crystal panel 14 only has components parallel to the transmission axis L6 of the reflective polarizer 22. As such, external light that has passed through the switch liquid crystal panel 14 is not reflected by the reflective polarizer 22.

(1.3) How Light from Backlight Advances

Light from the backlight enters the absorptive polarizer 20. The absorptive polarizer 20 only passes those components of light from the backlight that are parallel to the transmission axis L5. Consequently, light from the backlight entering the display panel 12 only has components parallel to the transmission axis L5.

An implementation where the display panel 12 is a liquid crystal panel, for example, and the operating mode of the liquid crystal is normally white TN mode will be considered. When this display panel 12 is to display white, for example, the liquid crystal molecules of the liquid crystal layer 30 of the display panel 12 are twisted 90 degrees. Consequently, light from the backlight that has passed through the display panel 12 only has components parallel to the transmission axis L4 of the absorptive polarizer 18. Thus, light from the backlight that has passed through the display panel 12 passes through the absorptive polarizer 18.

Light from the backlight that has passed through the absorptive polarizer 18 enters the reflective polarizer 22. The reflective polarizer 22 has the transmission axis L6, which is parallel to the transmission axis L4. Consequently, light from the backlight that has passed through the absorptive polarizer 18 passes through the reflective polarizer 22. Light from the backlight that has passed through the reflective polarizer 22 enters the switch liquid crystal panel 14. That is, light form the backlight entering the switch liquid crystal panel 14 only has components parallel to the transmission axis L6 of the reflective polarizer 22.

The rubbing axis L1 of the alignment film 40 is parallel to the transmission axis L6 of the reflective polarizer 22. In the switch liquid crystal panel 14, the operating mode of the liquid crystal is TN mode and the orientation of the liquid crystal molecules 50 remains unchanged. In other words, in the switch liquid crystal panel 14, as shown in FIG. 2, the liquid crystal molecules 50 are twisted 90 degrees. Further, the rubbing axis L2 of the alignment film 46 is perpendicular to the rubbing axis L1 of the alignment film 40. Consequently, the polarizing axis of light from the backlight that has entered the switch liquid crystal panel 14 is rotated 90 degrees when the light passes through the switch liquid crystal panel 14.

The transmission axis L3 of the absorptive polarizer 16 is parallel to the rubbing axis L2 of the alignment film 46. That is, light from the backlight that has passed through the switch liquid crystal panel 14 only has components parallel to the transmission axis L3 of the absorptive polarizer 16. As a result, light form the backlight that has passed through the switch liquid crystal panel 14 passes through the absorptive polarizer 16. This allows the viewer to see 2D images displayed by the display panel 12.

(2) 3D Display Mode

Figure 7:
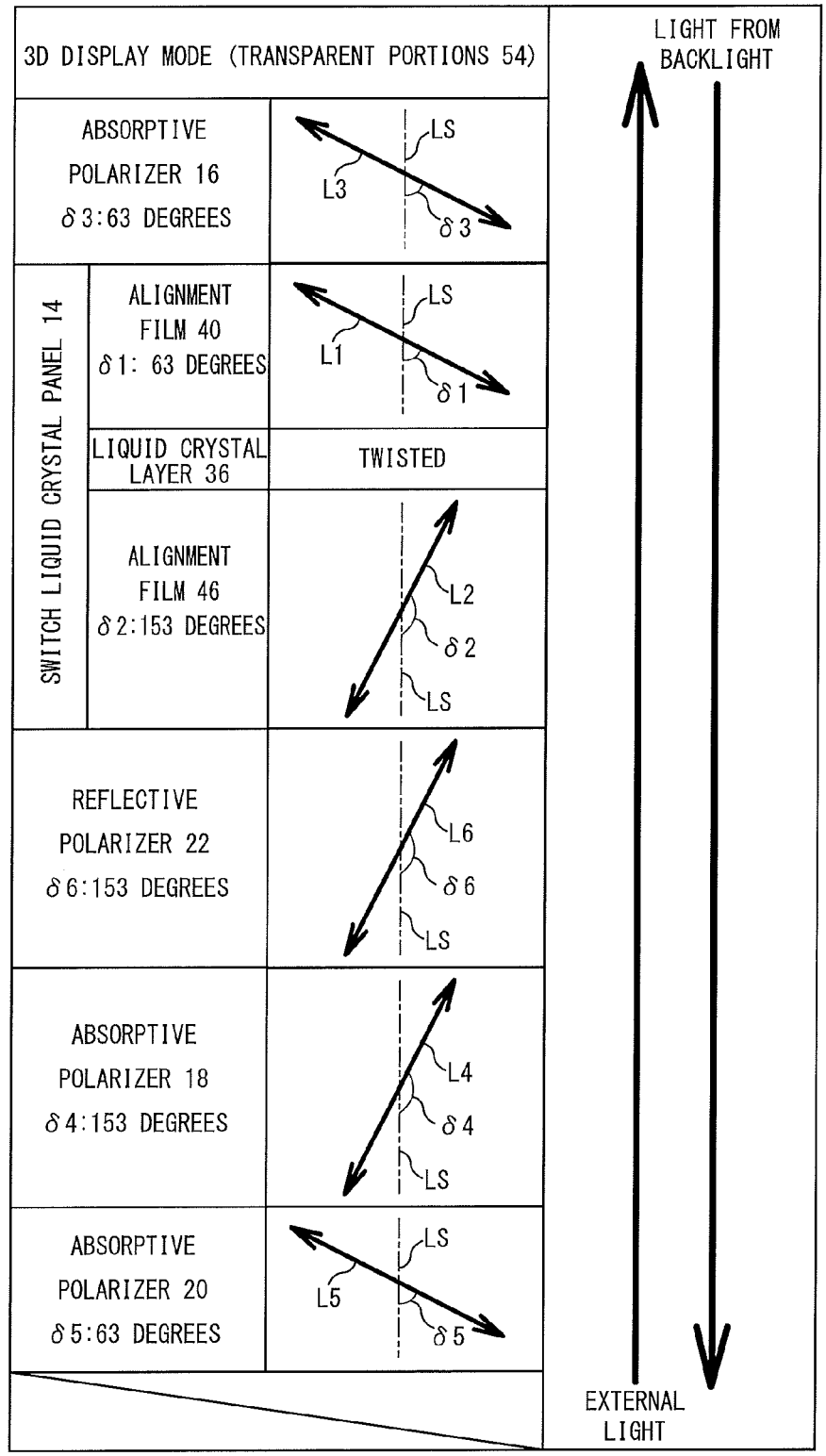
FIG. 7 illustrates how light advances through a transparent portion when the stereoscopic display device is in 3D display mode.
Figure 8:
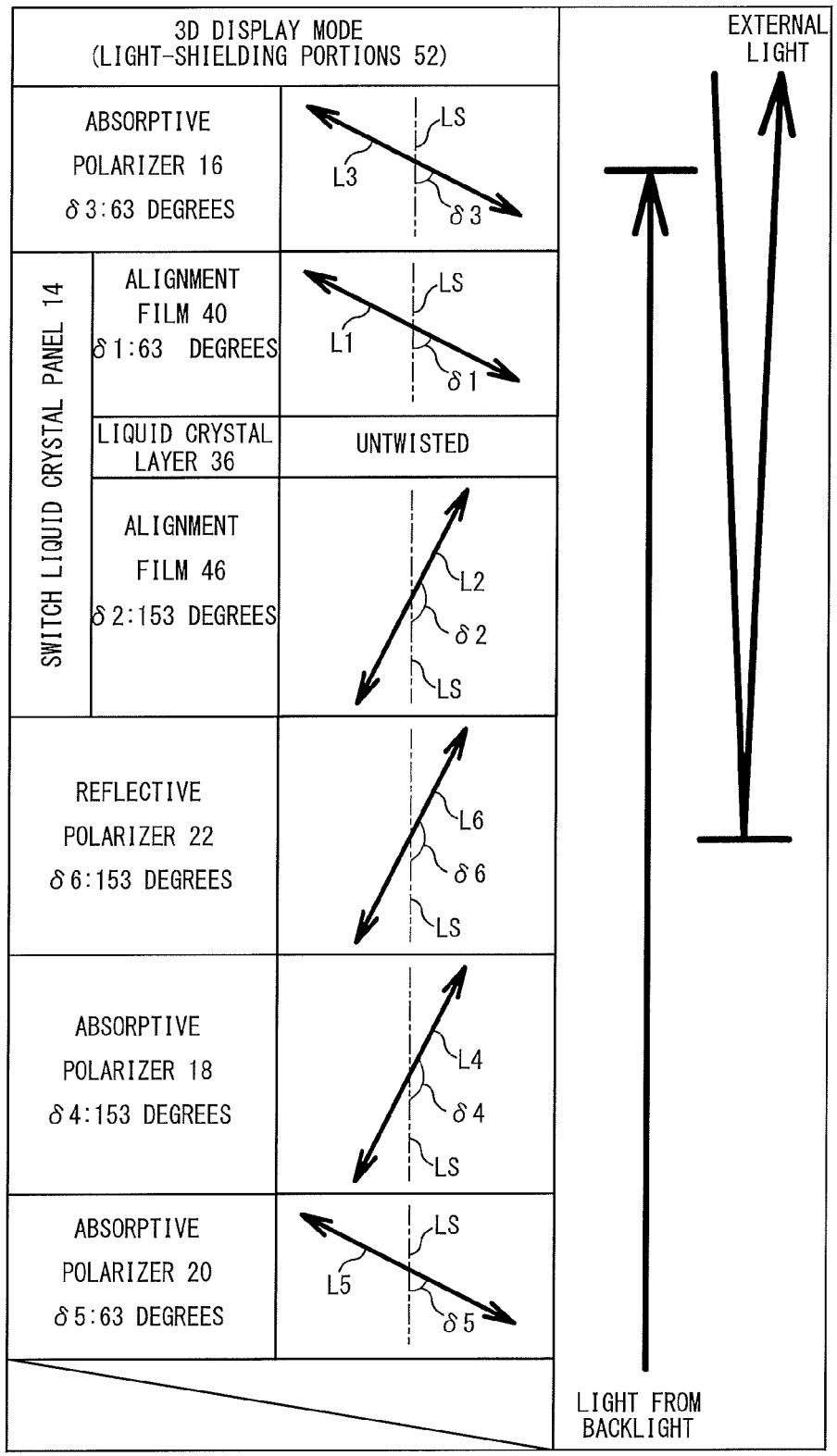
FIG. 8 illustrates how light advances through a light-shielding portion when the stereoscopic display device is in 3D display mode.

FIG. 7 illustrates how light (light from the backlight and external light) advances through a transparent portion 54 when the stereoscopic display device 10 is in 3D display mode. FIG. 8 illustrates how light (light from the backlight and external light) advances through a light-shielding portion 52 when the stereoscopic display device 10 is in 3D display mode. In 3D display mode, the display panel 12 displays stereoscopic images (left- and right-eye images) and the parallax barrier 48 is formed in the switch liquid crystal panel 14.

(2.1) Switch Liquid Crystal Panel in 3D Display Mode

Figure 5:
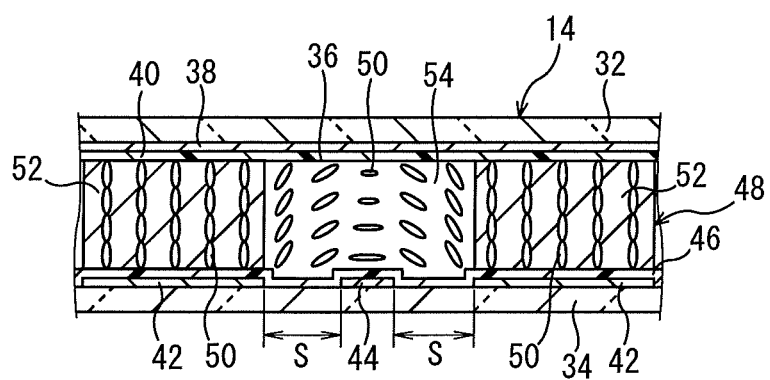
FIG. 5 is a cross-sectional view of the switch liquid crystal panel where a parallax barrier is formed.

In 3D display mode, as shown in FIG. 5, a voltage is applied between the driving electrodes 42 and common electrode 38 while no voltage is applied between the auxiliary electrodes 44 and common electrode 38. That is, the orientation of the liquid crystal molecules 50 in those portions of the liquid crystal layer 36 that are located between the driving electrodes 42 and common electrode 38 (i.e. the portions overlying the driving electrodes 42 as viewed looking at the front side of the switch liquid crystal panel 14) is changed, while the orientation of the liquid crystal molecules 50 in those portions of the layer located between the auxiliary electrodes 44 and common electrode 38 (i.e. the portions overlying the auxiliary electrodes 38 as viewed looking at the front side of the switch liquid crystal panel 14) remains unchanged. Those portions of the liquid crystal layer 36 that are located between the driving electrodes 42 and common electrode 38 serve as light-shielding portions 52, while the portions between light-shielding portions 52 serve as transparent portions 54.

(2.2) How External Light Advances

As shown in FIG. 5, the orientation of liquid crystal molecules 50 in a transparent portion 54 is different from that for a light-shielding portion 52. Thus, external light entering the switch liquid crystal panel 14 behaves differently depending on whether it passes through a transparent portion 54 or it passes through a light-shielding portion 52. A case of light passing through a transparent portion 54 and a case of light passing through a light-shielding portion 52 will be described below.

(2.2.1) External Light Passing Through Transparent Portion

External light enters the absorptive polarizer 16. The absorptive polarizer 16 absorbs those components of entering external light that are perpendicular to the transmission axis L3 and passes those components that are parallel to the transmission axis L3. Consequently, external light entering the switch liquid crystal panel 14 only has components parallel to the transmission axis L3.

The rubbing axis L1 of the alignment film 40 is parallel to the transmission axis L3 of the absorptive polarizer 16. In a transparent portion 54, as shown in FIG. 5, liquid crystal molecules 50 are not standing upright. Further, the rubbing axis L2 of the alignment film 46 is perpendicular to the rubbing axis L1 of the alignment film 40. Consequently, the polarizing axis of external light that has entered the transparent portion 54 is rotated 90 degrees when the light passes through the switch liquid crystal panel 14.

The rubbing axis L2 of the alignment film 46 is parallel to the transmission axis L6 of the reflective polarizer 22. Consequently, external light that has passed through the transparent portion 54 only has components parallel to the transmission axis L6 of the reflective polarizer 22. As such, external light that has passed through the transparent portion 54 is not reflected by the reflective polarizer 22.

(2.2.2) External Light Passing Through Light-Shielding Portion

External light enters the absorptive polarizer 16. The absorptive polarizer 16 absorbs those components of entering external light that are perpendicular to the transmission axis L3 and passes those components that are parallel to the transmission axis L3. Consequently, external light entering the switch liquid crystal panel 14 only has components parallel to the transmission axis L3.

The rubbing axis L1 of the alignment film 40 is parallel to the transmission axis L3 of the absorptive polarizer 16. In a light-shielding portion 52, as shown in FIG. 5, liquid crystal molecules 50 are standing upright. Consequently, the polarizing axis of external light that has entered the light-shielding portion 52 is not rotated when the light passes through the switch liquid crystal panel 14. In other words, external light that has passed through the light-shielding portion 52 only has components parallel to the transmission axis L3 of the absorptive polarizer 16.

The transmission axis L3 of the absorptive polarizer 16 is perpendicular to the transmission axis L6 of the reflective polarizer 22. Consequently, external light that has passed through the light-shielding portion 52 is reflected by the reflective polarizer 22

(2.3) How Light from Backlight Advances

Light from the backlight enters the absorptive polarizer 20. The absorptive polarizer 20 only passes those components of light from the backlight that are parallel to the transmission axis L5. Consequently, light from the backlight entering the display panel 12 only has components parallel to the transmission axis L5.

An implementation where the display panel 12 is a liquid crystal panel, for example, and the operating mode of the liquid crystal is normally white TN mode will be considered. When this display panel 12 is to display white, for example, the liquid crystal molecules of the liquid crystal layer 30 of the display panel 12 are twisted 90 degrees. Consequently, light from the backlight that has passed through the display panel 12 only has components parallel to the transmission axis L4 of the absorptive polarizer 18. Thus, light from the backlight that has passed through the display panel 12 passes through the absorptive polarizer 18.

Light from the backlight that has passed through the absorptive polarizer 18 enters the reflective polarizer 22. The reflective polarizer 22 has the transmission axis L6, which is parallel to the transmission axis L4. Consequently, light from the backlight that has passed through the absorptive polarizer 18 passes through the reflective polarizer 22. Light from the backlight that has passed through the reflective polarizer 22 enters the switch liquid crystal panel 14. That is, light from the backlight entering the switch liquid crystal panel 14 only has components parallel to the transmission axis L6 of the reflective polarizer 22.

As shown in FIG. 5, the orientation of liquid crystal molecules 50 in a transparent portion 54 is different from that for a light-shielding portion 52. Thus, light from the backlight entering the switch liquid crystal panel 14 behaves differently depending on whether it passes through a transparent portion 54 or it passes through a light-shielding portion 52. A case of light passing through a transparent portion 54 and a case of light passing through a light-shielding portion 52 will be described below.

(2.3.1) Light from Backlight Passing Through Transparent Portion

The rubbing axis L2 of the alignment film 46 is parallel to the transmission axis L6 of the reflective polarizer 22. In a transparent portion 54, as shown in FIG. 5, the liquid crystal molecules 50 are not standing upright. Further, the rubbing axis L1 of the alignment film 40 is perpendicular to the rubbing axis L2 of the alignment film 46. Consequently, the polarizing axis of light from the backlight entering the transparent portion 54 is rotated 90 degrees when the light passes through the switch liquid crystal panel 14.

The transmission axis L3 of the absorptive polarizer 16 is parallel to the rubbing axis L1 of the alignment film 40. That is, light from the backlight that has passed through the switch liquid crystal panel 14 only has components parallel to the transmission axis L3 of the absorptive polarizer 16. As a result, light form the backlight that has passed through the switch liquid crystal panel 14 passes through the absorptive polarizer 16. That is, the transparent portions 54 allow the viewer to see stereoscopic images displayed by the display panel 12.

(2.3.2) Light from Backlight Passing Through Light-Shielding Portion

The rubbing axis L2 of the alignment film 46 is parallel to the transmission axis L6 of the reflective polarizer 22. In a light-shielding portion 52, as shown in FIG. 5, liquid crystal molecules 50 are standing upright. Consequently, the polarizing axis of light from the backlight entering the light-shielding portion 52 is not rotated when the light passes through the switch liquid crystal panel 14. In other words, light from the backlight that has passed through the light-shielding portion 52 only has components perpendicular to the transmission axis L3 of the absorptive polarizer 16. Consequently, light from the backlight that has passed through the light-shielding portion 52 does not pass through the absorptive polarizer 16. That is, the light-shielding portions 52 prevent the viewer from seeing stereoscopic images displayed by the display panel 12.

The display panel 12 displays composite images each including separate stripe-shaped right- and left-eye images arranged alternately. At this time, if the parallax barrier 48 is formed in the switch liquid crystal panel 14, only the right-eye images reach the right eye of the viewer, and only the left-eye images reach the left eye of the viewer. As a result, the viewer can see 3D images without special glasses.

The size of the gap S between a driving electrode 42 and auxiliary electrode 44 is preferably 10 µm or larger. Thus, when the device is in 3D display mode, the transparent portions 54 are capable of focus light. This will improve luminance when the device is in 3D display mode.

(3) Mirror Mode

Figure 9:
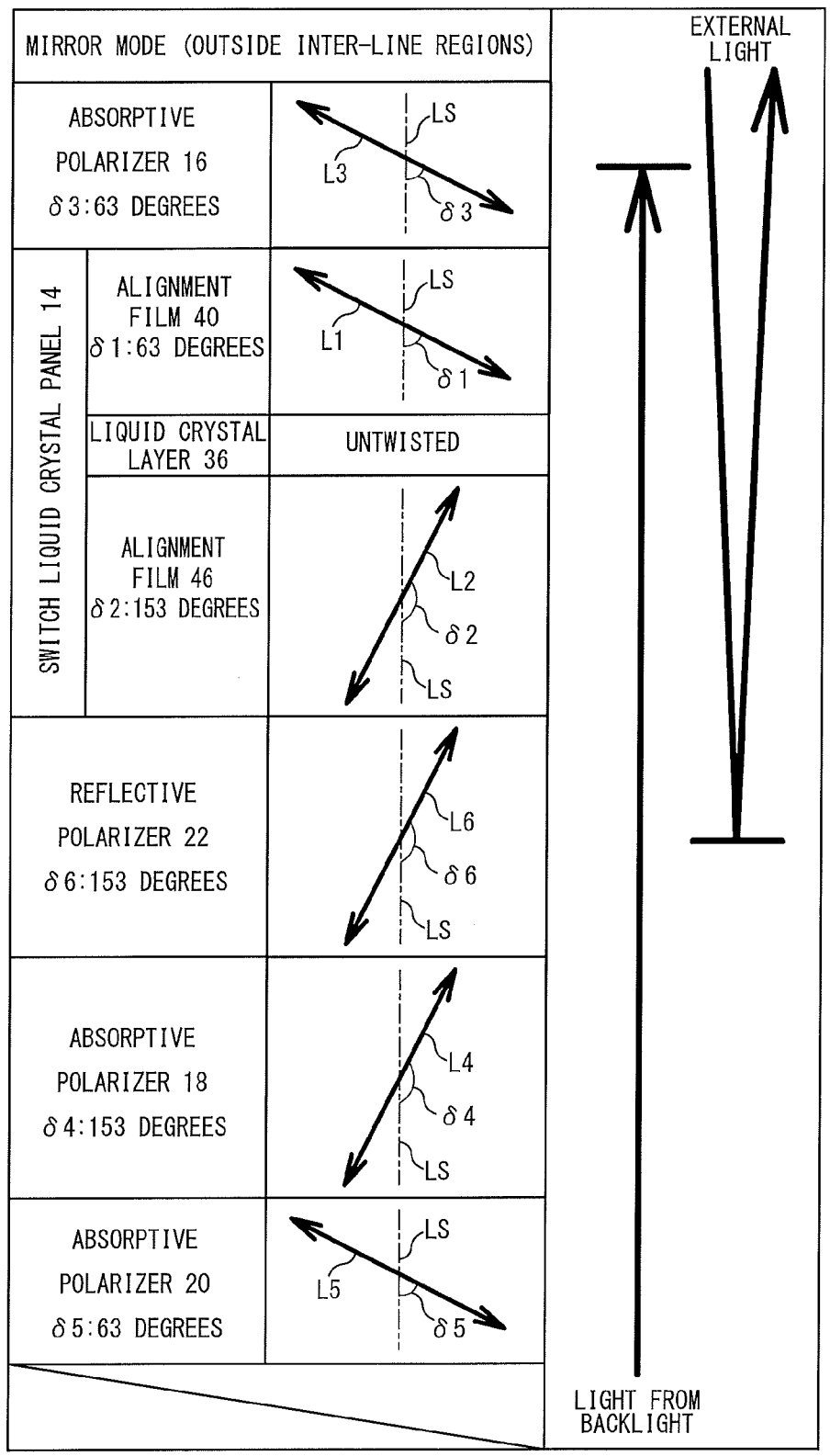
FIG. 9 illustrates how light advances through a region of the stereoscopic display device outside the inter-line regions when the device is in mirror mode.
Figure 10:
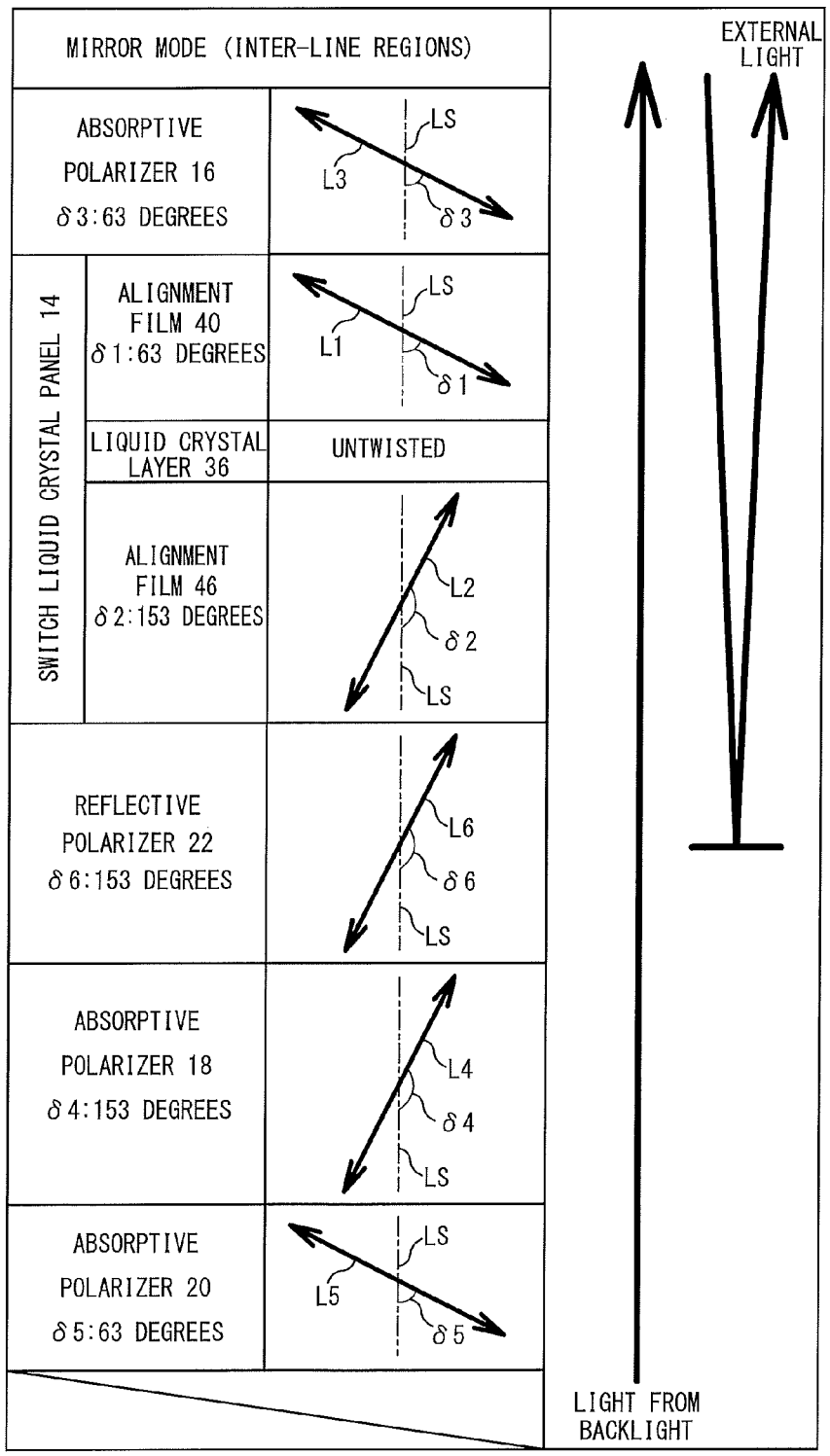
FIG. 10 illustrates how light advances through an inter-line region when the stereoscopic display device is in mirror mode.

FIG. 9 illustrates how light (light from the backlight and external light) advances through a region of the stereoscopic display device 10 outside the inter-line regions when the device is in mirror mode. FIG. 10 illustrates how light (light from the backlight and external light) advances through an inter-line region when the stereoscopic display device 10 is in mirror mode. Mirror mode means the mode in which the switch liquid crystal panel 14 serves as a mirror. Inter-line region means a portion of the liquid crystal layer 36 that is located between a driving electrode 42 and an auxiliary region 44 as viewed looking at the front side of the switch liquid crystal panel 14. In other words, inter-line region means a portion of the liquid crystal layer 36 that overlies a gap S (see FIG. 2) as viewed looking at the front side of the switch liquid crystal panel 14.

(3.1) Switch Liquid Crystal Panel in Mirror Mode

Figure 11:
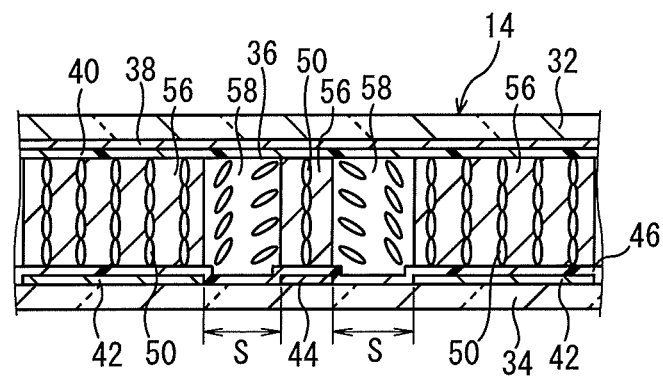
FIG. 11 is a cross-sectional view of the switch liquid crystal panel when the stereoscopic display device is in mirror mode.

In mirror mode, as shown in FIG. 11, a voltage is applied between the driving electrodes 42 and common electrode 38 and between the auxiliary electrodes 44 and common electrode 38. That is, liquid crystal molecules 50 in the portions of the liquid crystal layer 36 that are located between the driving electrodes 42 and common electrode 38 and between the auxiliary electrodes 44 and common electrode 38 are standing upright. The mirror region 56 is formed in these portions. On the other hand, liquid crystal molecules 50 in the portions of the liquid crystal layer 36 that are located between the driving electrodes 42 and auxiliary electrodes 44 as viewed looking at the front side of the switch liquid crystal panel 14 (i.e. the inter-line regions 58) are not standing upright.

(3.2) How External Light Advances

As shown in FIG. 11, the orientation of liquid crystal molecules 50 in a mirror region 56 is different from that for an inter-line region 58. Thus, external light entering the switch liquid crystal panel 14 behaves differently depending on whether it passes through a mirror region 56 or it passes through an inter-line region 58. A case of light passing through a mirror region 56 and a case of light passing through an inter-line region 58 will be described below.

(3.2.1) External Light Passing Through Mirror Region

External light enters the absorptive polarizer 16. The absorptive polarizer 16 absorbs those components of entering external light that are perpendicular to the transmission axis L3 and passes those components that are parallel to the transmission axis L3. Consequently, external light entering the switch liquid crystal panel 14 only has components parallel to the transmission axis L3.

The rubbing axis L1 of the alignment film 40 is parallel to the transmission axis L3 of the absorptive polarizer 16. In a mirror region 56, as shown in FIG. 11, liquid crystal molecules 50 are standing upright. Consequently, the polarizing axis of external light that has entered the mirror region 56 is not rotated when the light passes through the switch liquid crystal panel 14. In other words, external light that has passed through the mirror region 56 only has components parallel to the transmission axis L3 of the absorptive polarizer 16.

The transmission axis L3 of the absorptive polarizer 16 is perpendicular to the transmission axis L6 of the reflective polarizer 22. Consequently, external light that has passed through the mirror region 56 is reflected by the reflective polarizer 22.

(3.2.2) External Light Passing Through Inter-Line Region

External light enters the absorptive polarizer 16. The absorptive polarizer 16 absorbs those components of entering external light that are perpendicular to the transmission axis L3 and passes those components that are parallel to the transmission axis L3. Consequently, external light entering the switch liquid crystal panel 14 only has components parallel to the transmission axis L3.

The rubbing axis L1 of the alignment film 40 is parallel to the transmission axis L3 of the absorptive polarizer 16. In an inter-line region 58, as shown in FIG. 11, liquid crystal molecules 50 are not standing upright. Further, the rubbing axis L2 of the alignment film 46 is perpendicular to the rubbing axis L1 of the alignment film 40. Consequently, the polarizing axis of external light entering the transparent portion 54 is rotated 90 degrees when the light passes through the switch liquid crystal panel 14.

The rubbing axis L2 of the alignment film 46 is parallel to the transmission axis L6 of the reflective polarizer 22. Consequently, external light that has passed through the inter-line region 58 only has components parallel to the transmission axis L6 of the reflective polarizer 22. As such, external light that has passed through the inter-line region 58 is not reflected by the reflective polarizer 22.

(3.3) How Light from Backlight Advances

Light from the backlight enters the absorptive polarizer 20. The absorptive polarizer 20 only passes those components of light from the backlight that are parallel to the transmission axis L5. Consequently, light from the backlight entering the display panel 12 only has components parallel to the transmission axis L5.

An implementation where the display panel 12 is a liquid crystal panel, for example, and the operating mode of the liquid crystal is normally white TN mode will be considered. When this display panel 12 is to display white, for example, the liquid crystal molecules of the liquid crystal layer 30 of the display panel 12 are twisted 90 degrees. Consequently, light from the backlight that has passed through the display panel 12 only has components parallel to the transmission axis L4 of the absorptive polarizer 18. Thus, light from the backlight that has passed through the display panel 12 passes through the absorptive polarizer 18.

Light from the backlight that has passed through the absorptive polarizer 18 enters the reflective polarizer 22. The reflective polarizer 22 has the transmission axis L6, which is parallel to the transmission axis L4. Consequently, light from the backlight that has passed through the absorptive polarizer 18 passes through the reflective polarizer 22. Light from the backlight that has passed through the reflective polarizer 22 enters the switch liquid crystal panel 14. That is, light from the backlight entering the switch liquid crystal panel 14 only has components parallel to the transmission axis L6 of the reflective polarizer 22.

As shown in FIG. 11, the orientation of liquid crystal molecules 50 in a mirror region 56 is different from that for an inter-line region 58. Thus, light from the backlight entering the switch liquid crystal panel 14 behaves differently depending on whether it passes through a mirror region 56 or it passes through an inter-line region 58. A case of light passing through a mirror region 56 and a case of light passing through an inter-line region 58 will be described below.

(3.3.1) Light from Backlight Passing Through Mirror Region

The rubbing axis L2 of the alignment film 46 is parallel to the transmission axis L6 of the reflective polarizer 22. In a mirror region 56, as shown in FIG. 11, liquid crystal molecules 50 are standing upright. Consequently, the polarizing axis of light from the backlight entering the mirror region 56 is not rotated when the light passes through the switch liquid crystal panel 14. In other words, light from the backlight that has passed through the mirror region 56 only has components perpendicular to the transmission axis L3 of the absorptive polarizer 16. Consequently, light from the backlight that has passed through the light-shielding portion 56 does not pass through the absorptive polarizer 16.

(3.3.2) Light from Backlight Passing Through Inter-Line Region

The rubbing axis L2 of the alignment film 46 is parallel to the transmission axis L6 of the reflective polarizer 22. In an inter-line region 58, as shown in FIG. 11, the liquid crystal molecules 50 are not standing upright. Further, the rubbing axis L1 of the alignment film 40 is perpendicular to the rubbing axis L2 of the alignment film 46. Consequently, the polarizing axis of light from the backlight entering the inter-line region 58 is rotated 90 degrees when the light passes through the switch liquid crystal panel 14.

The transmission axis L3 of the absorptive polarizer 16 is parallel to the rubbing axis L1 of the alignment film 40. That is, light from the backlight that has passed through the switch liquid crystal panel 14 only has components parallel to the transmission axis L3 of the absorptive polarizer 16. As a result, light from the backlight that has passed through the switch liquid crystal panel 14 passes through the absorptive polarizer 16.

Figure 12:
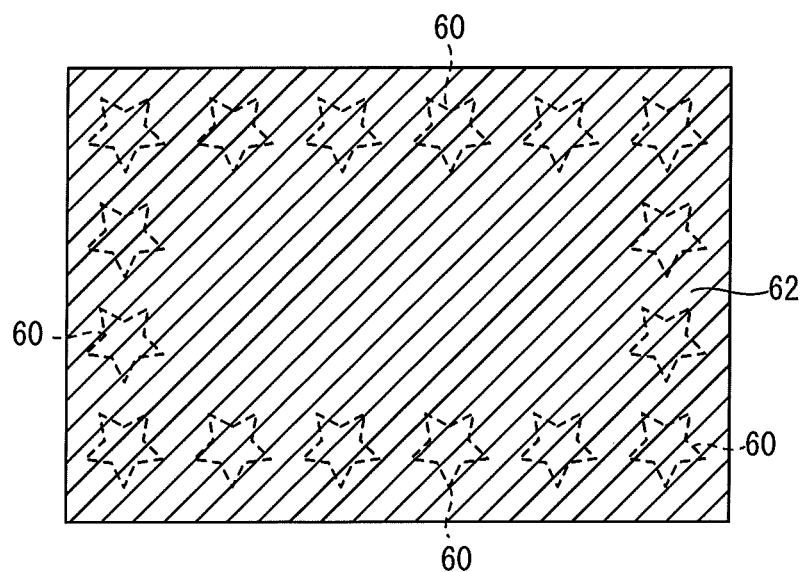
FIG. 12 is a pictorial diagram of the device where 2D display (with a pattern) is realized while a mirror formed by the stereoscopic display device is maintained.

A case where a 2D image is displayed on the display panel 12 when the device is in mirror mode will be considered. In such a case, a 2D image displayed on the display panel 12 can be seen by the viewer through inter-line regions 58. That is, the viewer may see a mirror 62 with a pattern 60, as shown in FIG. 12, for example. In other words, the viewer may recognize a 2D image displayed on the display panel 12 and a mirror at the same time.

The size of the gap S between a driving electrode 42 and auxiliary electrode 44 is not limited to the range described above. For example, the size of the gap S may be less than 10 μm, in which case the ability of the transparent portions 54 to focus light when the device is in 3D display mode decreases, but the reflectivity of the mirror increases.

Second Embodiment

Figure 13:
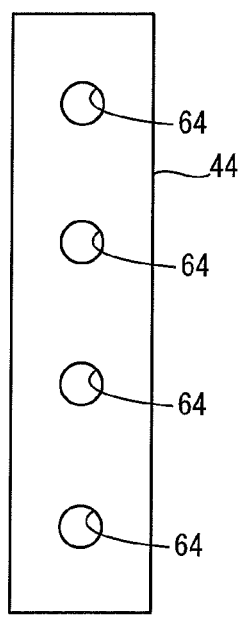
FIG. 13 is a plan view of an auxiliary electrode that can be employed in a second embodiment of the present invention.

In the present embodiment, as shown in FIG. 13, each auxiliary electrode 44 includes a plurality of openings (transparent regions) 64. The openings 64 are arranged in a longitudinal direction of the auxiliary electrode 44. It is desirable that the openings 64 be arranged at regular intervals. In the implementation shown in FIG. 13, the openings 64 are circular in shape; however, the openings 64 are not limited to a particular shape. The size (width) of each opening 60 may be, for example, in the range of 10 to 50 μm. The sum of the areas of all openings 60 and gaps S is preferably 20% or less of the surface area of the active area of the switch liquid crystal panel 14 (i.e. the area covered by the common electrode 38 in the present embodiment). Thus, 2D image display and good mirror properties may be realized at the same time.

The use of such auxiliary electrodes 44 will eliminate the necessity to increase the size of the gaps S between the driving electrodes 42 and auxiliary electrodes 44 to allow light from the backlight to pass through.

Application Example of Second Embodiment

Figure 14:
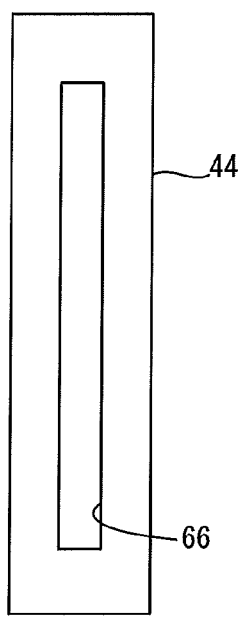
FIG. 14 is a plan view of another auxiliary electrode that can be employed in the second embodiment of the present invention.

In the present application example, as shown in FIG. 14, a single opening 66 is formed in each auxiliary electrode 44. Such an opening 66 will also provide the intended effects.

Third Embodiment

In the present embodiment, the common electrode 38 is not provided on the substrate 32. Instead, as shown in FIG. 14, driving electrodes (second driving electrodes) 68 and auxiliary electrodes (second auxiliary electrodes) 70 are arranged alternately. The electrodes 68 and 70 may be, for example, transparent conductive films of indium tin oxide (ITO).

Each of the electrodes 68 and 70 extends in a horizontal direction of the substrate 32 (i.e. a horizontal direction of the display region of the display panel 12) with a generally constant width. In other words, the driving electrodes 68 and auxiliary electrodes 70 are alternately arranged in a vertical direction of the substrate 32 (i.e. a vertical direction of the display region of the display panel 12).

Figure 15:
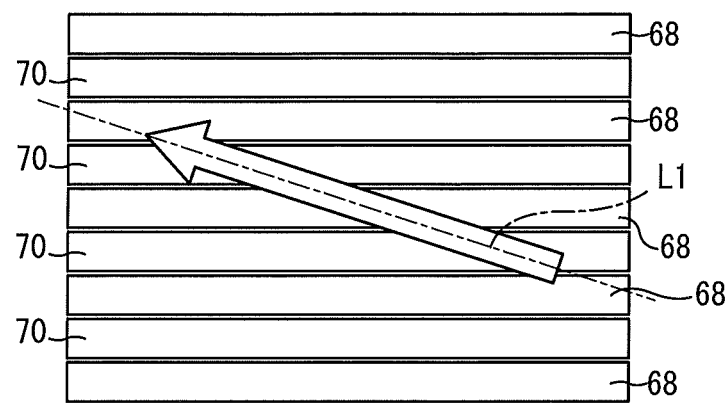
FIG. 15 is a plan view of driving electrodes and auxiliary electrodes provided on one of the substrates of a switch liquid crystal panel of a third embodiment of the present invention.

In the present embodiment, two different parallax barriers may be formed in the switch liquid crystal panel 14. A parallax barrier 72 will be described with reference to FIG. 15. The parallax barrier 72 may be formed by causing the auxiliary electrodes 44, driving electrodes 68 and auxiliary electrodes 70 to be at the same potential (0 volts, for example) and causing the driving electrodes 42 to be at a potential different from that of the electrodes 44, 68 and 70 (5 volts, for example). This changes the orientation of liquid crystal molecules 50 located between the driving electrodes 42 and the common electrode (i.e. the driving electrodes 68 and auxiliary electrodes 70). Thus, those portions of the liquid crystal layer 36 that are located between the driving electrodes 42 and the common electrode (i.e. the driving electrodes 68 and auxiliary electrodes 70) function as light-shielding portions 74, while the portions between the light-shielding portions 74 function as transparent portions 76. As a result, the parallax barrier 72 including light-shielding portions 74 and transparent portions 76 arranged alternately is formed. The light-shielding portions 74 and transparent portions 76 are alternately arranged in a horizontal direction of the display region of the display panel 12.

Figure 16:
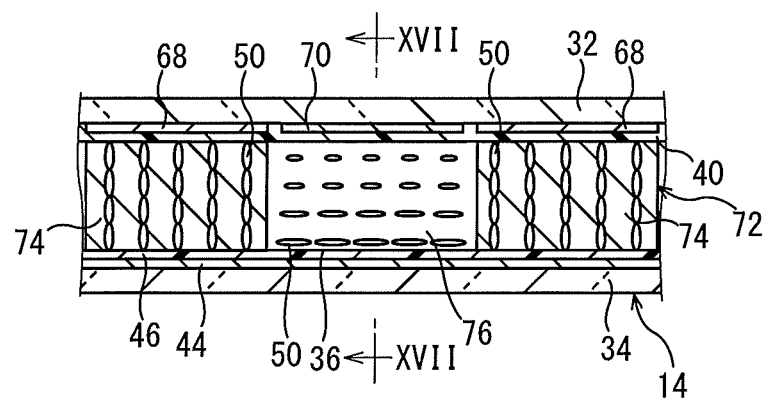
FIG. 16 is a cross-sectional view of the switch liquid crystal panel where a parallax barrier is formed.
Figure 17:
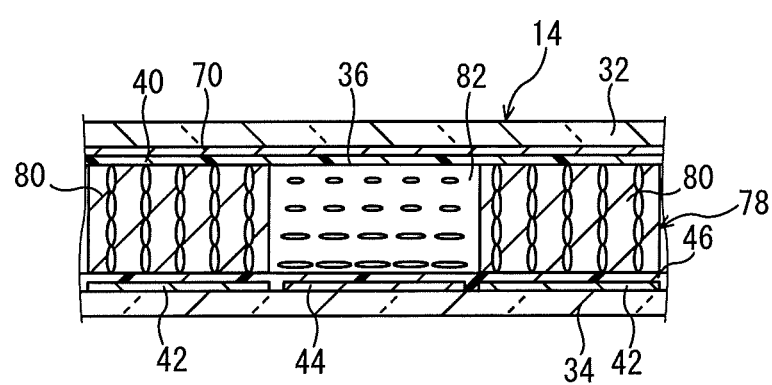
FIG. 17 is a cross-sectional view of the switch liquid crystal panel where another parallax barrier is formed.

In the present embodiment, in addition to the parallax barrier 72, a parallax barrier 78 may be formed in the switch liquid crystal panel 14. The parallax barrier 78 will be described with reference to FIG. 16. The parallax barrier 78 may be formed by causing the driving electrodes 42, auxiliary electrodes 44 and auxiliary electrodes 70 to be at the same potential (0 volts, for example) and causing the driving electrodes 68 to be at a potential different from that of the electrodes 42, 44 and 70 (5 volts, for example). This changes the orientation of liquid crystal molecules 50 located between the driving electrodes 68 and the common electrode (i.e. the driving electrodes 42 and auxiliary electrodes 44). Thus, those portions of the liquid crystal layer 36 that are located between the driving electrodes 68 and the common electrode (i.e. the driving electrodes 42 and auxiliary electrodes 44) function as light-shielding portions 80, while the portions between the light-shielding portions 80 function as transparent portions 82. As a result, the parallax barrier 78 including light-shielding portions 80 and transparent portions 82 arranged alternately is formed. The light-shielding portions 80 and transparent portions 82 are alternately arranged in a vertical direction of the display region of the display panel 12.

In the present embodiment, the mirror mode is realized by causing the driving electrodes 42 and auxiliary electrodes 44 to be at the same potential and causing the driving electrodes 68 and auxiliary electrodes 70 to be at a potential different from that of the electrodes 42 and 44. In the present embodiment, each gap S must be relatively small because 3D properties deteriorate if the gaps S implement the transparent regions whose width is to be increased. Thus, the transparent regions must be implemented by openings each formed in the overlap region of an auxiliary electrode 44 and an auxiliary electrode 70 as viewed looking at the front side of the switch liquid crystal panel 14 (i.e. a region that does not form a light-shielding portion when the device is in 3D display mode for landscape display or portrait display (i.e. a region that forms a transparent portion)).

While embodiments of the present invention have been described in detail, they are merely illustrative examples and the present invention is not limited in any way to the above embodiments.

For example, in the first and second embodiments, the display panel 12 may be a plasma display panel, an organic electroluminescence (EL) panel, or an inorganic EL panel.

In the first to third embodiments, the rubbing axis L1 of the alignment film 40 may be perpendicular to the transmission axis L3 of the polarizer 16 and the rubbing axis L2 of the alignment film 46 may be perpendicular to the transmission axis L6 of the reflective polarizer 22.

The invention claimed is:

1. A stereoscopic display device comprising:
a display panel;
a switch liquid crystal panel located closer to a viewer than the display panel is;
an absorptive polarizer located closer to the viewer than the switch liquid crystal panel is; and
a reflective polarizer located between the display panel and the switch liquid crystal panel, wherein
the display panel is capable of selectively displaying a planar image and a stereoscopic image,
the switch liquid crystal panel is capable of operating as a parallax barrier having transparent portions and light-shielding portions arranged alternately,
the absorptive polarizer is capable of passing those components of light entering the absorptive polarizer that are parallel to a transmission axis of the absorptive polarizer while absorbing those components that are perpendicular to the transmission axis of the absorptive polarizer,
the reflective polarizer has a transmission axis perpendicular to the transmission axis of the absorptive polarizer and is capable of passing those components of light entering the reflective polarizer that are parallel to the transmission axis of the reflective polarizer while reflecting those components that are perpendicular to the transmission axis of the reflective polarizer,
the switch liquid crystal panel includes:
a pair of substrates;
a liquid crystal layer enclosed between the substrates;
a common electrode provided on one of the substrates;
a plurality of first driving electrodes provided on the other one of the substrates for working together with the common electrode to form the light-shielding portions when a voltage is applied; and
a plurality of first auxiliary electrodes provided on the other one of the substrates, the driving electrodes and the auxiliary electrodes being arranged alternately,
at least one of the substrates includes a transparent region capable of passing light from the display panel,
the stereoscopic display panel operates in a first display mode, a second display mode, and a third display mode,
in the first display mode, the first driving electrodes, the first auxiliary electrodes and the common electrodes are caused to be at the same potential,
in the second display mode, the first driving electrodes and the common electrodes are caused to be at different potentials, and the first auxiliary electrodes and the common electrodes are caused to be at the same potential, and
in the third display mode, the first driving electrodes and the first auxiliary electrodes are caused to be at the same potential, and the common electrodes are caused to be at a different potential from a potential of the first driving electrodes and the first auxiliary electrodes.

2. The stereoscopic display device according to claim 1, wherein the common electrode includes:
a plurality of second driving electrodes provided on the one of the substrates; and
a plurality of second auxiliary electrodes provided on the one of the substrates, the second driving electrodes and the second auxiliary electrodes being arranged alternately,
the second driving electrodes and the second auxiliary electrodes being perpendicular to the first driving electrodes and the first auxiliary electrodes as viewed looking at a front side of the switch liquid crystal panel.

* * * * *